2,810,649

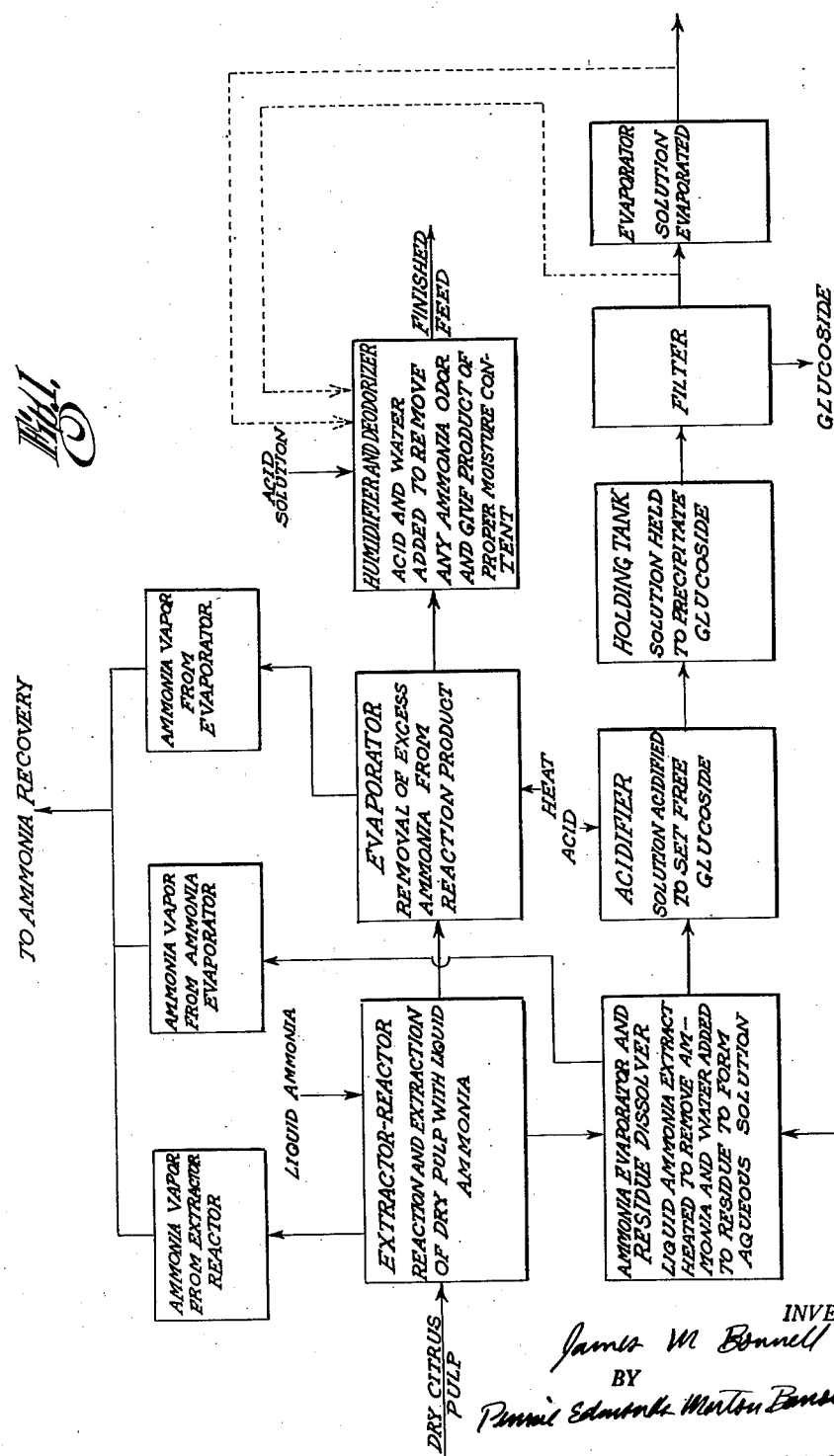

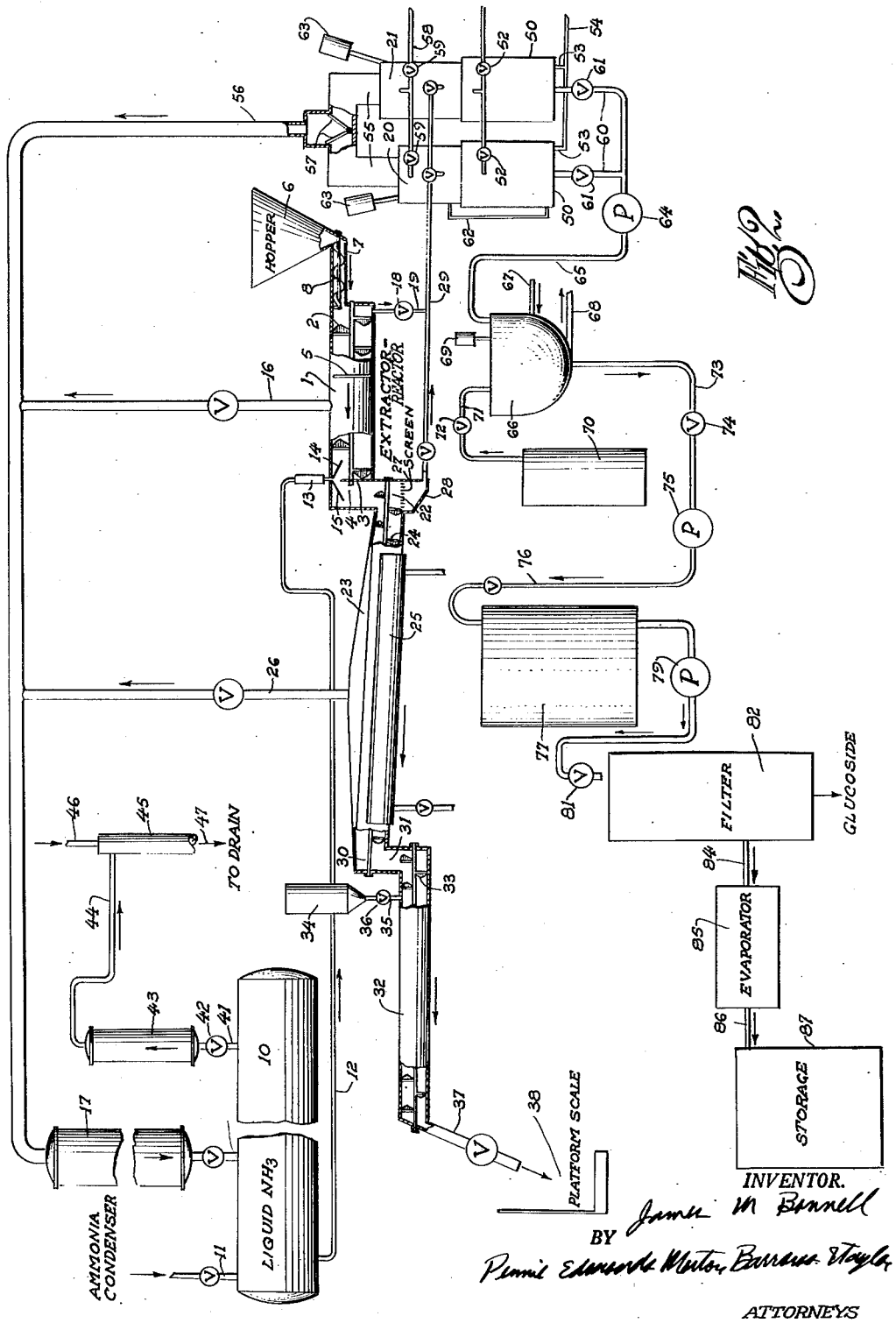

PROCESS FOR TREATING CITRUS PULP

James M. Bonnell, Dunedin, Fla., assignor, by mesne assignments, to Minute Maid Corporation, New York, N. Y., a corporation of Florida Application April 24, 1953, Serial No. 350,891

6 Claims. (Cl. 99—2)

This invention relates to the treatment of dried citrus pulp for the recovery of glucosides, such as hesperidin, therefrom, and for the production of a substantially glucoside-free cattle feed product. More particularly, the invention relates to improvements in the treatment of dried citrus pulp to effect selective extraction of glucosides, such as hesperidin, and a limited amount of sugar therefrom, in the form of an ammoniated extract, and the simultaneous production of ammoniated substantially glucoside-free cattle feed products. The invention includes an improved process of treating dried citrus pulp to produce improved cattle feed products.

The dried citrus pulp which is treated by the present process is pulp such as results from the pressing of citrus waste to remove a large portion of the water therefrom and the drying of the pressed pulp. Citrus wastes are commonly admixed with a small amount of lime and ground and permitted to stand for a time, and then subjected to pressing to remove a large portion of the water therefrom, and with subsequent drying to form a dried citrus pulp. The water removed by the pressing operation is commonly concentrated to form so-called citrus molasses.

Such dried citrus pulps contain glucosides in appreciable amount. Orange pulp contains hesperidin as its principal glucoside. Grapefruit pulp contains naringin as its principal glucoside. Other citrus pulps contain other glucosides. Ordinary dried citrus pulp such as results from liming and subsequent drying contains a relatively high content of sugars, but only a limited amount of nitrogen or protein, e. g., around 6% crude protein.

The process of the present invention extracts the glucosides from the dried citrus pulp together with a limited extraction of sugars, leaving the sugar content of the pulp largely unextracted. And both the resulting pulp and the extracted sugars are in the form of ammoniated products of relatively high protein-equivalent content.

According to the present invention, the dried citrus pulp is subjected to reaction and limited extraction with an excess of liquid ammonia at a low temperature, around the boiling point of liquid ammonia, to effect a limited and partial extraction of the pulp, together with a reaction of the liquid ammonia with the constituents of the pulp. An excess of liquid ammonia at low temperature and in a short time reacts with the dried pulp to form ammoniated products, some of which are readily soluble in excess ammonia, including the glucosides such as hesperidin. By regulating the amount of excess liquid ammonia, the glucosides such as hesperidin can be readily and substantially completely extracted, together with a limited amount of sugars, while leaving the main portion of the dried pulp in its reacted ammoniated condition. By withdrawing the excess liquid ammonia solution, the ammoniated product is freed from its glucoside content and also freed from a small and regulated amount of its ammonia content while leaving the ammoniated pulp, from which the excess liquid ammonia solution is removed, in the form of a valuable ammoniated cattle feed product, which can readily be freed from excess ammonia.

In carrying out the process, the dried citrus pulp is intimately admixed with an excess of liquid ammonia at a low temperature and the liquid ammonia is permitted to react with the pulp for a short time. The reaction of the liquid ammonia with the dried pulp is an exothermic reaction, but by using an excess of liquid ammonia the heat of reaction is neutralized by the vaporization of some of the excess liquid ammonia, so that the temperature is maintained at a low temperature, around the boiling point of liquid ammonia, during the reaction. The vaporized ammonia, vaporized by the heat of reaction and by the heat of the added citrus pulp, is recovered in a suitable ammonia recovery system for reuse.

After the reaction of the citrus pulp with the excess liquid ammonia has taken place, the excess liquid ammonia, with its dissolved glucosides, and with a limited amount of dissolved sugars, is separated from the remainder of the pulp, giving a solution in liquid ammonia of the glucosides and of extracted sugars in the form of an ammoniated product. This liquid ammonia solution is an intermediate product of the process and is advantageously treated for the recovery therefrom of the glucosides and of the sugars or ammoniated sugars.

The ammoniated product remaining after the removal of the excess liquid ammonia extract will still be wet with the liquid ammonia and is treated to remove the excess ammonia therefrom, which can readily be accomplished by moderate heating and with collecting and recovery of the ammonia vapors for reuse in the process. The heating of the product does not, however, completely free it from an ammonia odor. The residual ammonia odor is undesirable from a cattle feed point of view and is also irritating. It can, however, readily be removed by adding an acidified liquor such as a dilute acid solution.

The dried citrus pulp does not need to be completely freed from water but may contain a normal content of e. g. around 10% of water or even up to around 20% of moisture or somewhat more. The presence of a small amount of water in the pulp does not appear to interfere with the reaction and extraction operation.

The amount of liquid ammonia used for treating the dried pulp can be varied. A sufficient excess should be used not only to insure reaction with the pulp but also to effect extraction of the glucosides and a limited extraction of the sugars. If too large an amount of liquid ammonia is used and the reaction and extraction are continued too long, a large and undesirable proportion of the sugars will be dissolved and extracted and removed, leaving a corresponding reduced amount of sugars in the ammoniated product after the removal of the extract therefrom. It is desirable to limit the amount of excess liquid ammonia so that the sugars are extracted only to a limited extent, leaving the major portion of the sugars behind in the extracted product. Thus, in continuous extraction of the dried citrus pulp with liquid ammonia, the amount of liquid ammonia may be around 1080 pounds for each 500 pounds of dry solids in the pulp treated.

The time required for the reaction of the liquid ammonia with the dried citrus pulp and for effecting the extraction of the glucosides and a limited amount of sugars is relatively short. A time as short as 5 minutes appears to be entirely sufficient, and a longer time of up to around 20 minutes or somewhat more also is satisfactory.

In carrying out the process, it is advantageous to maintain effective agitation of the mixture of pulp and liquid ammonia to insure thorough and intimate contact and reaction, particularly where a limited amount of excess liquid ammonia is used.

The present process has the advantage that it can be carried out at atmospheric pressure and at a low temperature, around the boiling point of liquid ammonia, −28° F. The temperature is self-maintaining because the heating effect of the added citrus pulp and the heat of reaction will vaporize some of the excess liquid ammonia, which can be recovered in an ammonia absorption system for reuse. The process can also be carried out at pressures lower than atmospheric and also as pressures higher than atmospheric, but the use of vacuum or pressure apparatus which would be required in such cases is unnecessary when the process is carried out at atmospheric pressure. The apparatus in which the reaction is carried out should, of course, be adequately insulated or lagged to avoid heat losses and to minimize the vaporization of liquid ammonia.

The reactions which take place between the citrus pulp and the liquid ammonia result in the formation of reaction products in which the ammonia is chemically combined in the form of addition or reaction products. The glucosides such as hesperidin and naringin appear to be converted into soluble ammonia compounds, soluble in the liquid ammonia. The sugars also appear to be largely combined with the ammonia, as indicated by the relatively high nitrogen content of both the extracted product and of the sugars contained in the extract.

The extracted product, remaining after the removal of the aqueous ammonia extract, is separately treated by moderate heating to remove excess ammonia and treatment with an acid to fix or remove the ammonia odor, and is a valuable ammoniated cattle feed with a relatively high content of combined nitrogen or protein equivalent containing e. g. around 14% crude protein equivalent and 10% moisture.

The combined reaction and extraction process can be carried out as a batch operation by admixing the dried citrus pulp with an excess of liquid ammonia and permitting the mixture to stand with or without agitation for a few minutes before withdrawing the extract from the residue. The extract containing the glucosides and a limited amount of sugar can be separately treated, as a batch operation or by a continuous process, to separate the glucosides from the sugars. The extracted product, still moist with liquid ammonia, is separately treated by moderate heating to remove the excess ammonia and by then adding a small amount of an acid liquor to neutralize the ammonia odor, and is then a product ready for shipment and use as an ammoniated cattle feed.

The process can advantageously be carried out, however, as a continuous process, with continuous supply of the dried citrus pulp and liquid ammonia, with continuous agitation of the mixture to insure reaction and partial extraction, with drawing off and recovery of ammonia vaporized during the reaction and extraction, with drawing off and recovery of ammonia vaporized during the reaction and extraction, with continuous drawing off of the extract from the residue, and with continuous heating of the residue to remove excess ammonia therefrom, and finally with continuous addition of aqueous acid material to remove the ammonia odor.

The present invention also provides an improved process for treating the liquid ammonia extract, containing the glucosides such as hesperidin and part of the sugars to separate the glucosides therefrom. This separation is advantageously effected by first heating the extract to drive off the ammonia therefrom more or less completely and with recovery of the ammonia vapors in a suitable ammonia recovery system. To the resulting mixture of ammoniated sugar and glucoside, water is added to form aqueous solution, this solution is acidified to set free the glucoside and to initiate crystallization of the glucoside from the aqueous solution. By permitting the acidified solution to stand, the crystallization of the glucoside such as hesperidin is substantially complete, and the removal of this product by filtration leaves an ammoniated aqueous sugar solution which can advantageously be concentrated to syrupy consistency and added to the extracted residue after it has been freed from excess ammonia.

The return of the ammoniated sugar extract in this way and its admixture with the extracted product gives a final product which contains substantially all of the constituents of the original feed except the glucosides in the form of the ammoniated products. The return of the concentrated ammoniated sugar solution, after separating the glucosides, for admixture with the extracted residue, will serve to neutralize any ammonia odor and make unnecessary the addition of an acid solution for that purpose. If the amount of water added with the concentrated liquid makes the product too moist, it can be further dried to its desired moisture content by a separate drying operation.

In carrying out the process, ammonia vapors are given off during the reaction and extracting step of the process as well as in the heating of the extracted residue to remove ammonia therefrom and also from the extract when the liquid ammonia is removed therefrom. These ammonia vapors from the various steps of the process are advantageously combined and passed to an ammonia condenser to condense the ammonia to liquid ammonia for reuse or to one or another of the known and available types of ammonia recovery systems where the ammonia vapors can be recovered and reconverted into liquid ammonia for further use in the process.

The invention will be further described in connection with the accompany drawings, in which:

Figure 1 is a flow sheet illustrating the process and the various steps and sequence of steps, and Figure 2 shows, in a somewhat diagrammatic and conventional manner, an arrangement of apparatus for carrying out the process. It will be understood that the specific description, and the particular arrangement of apparatus shown illustrate the invention but that the invention is not limited thereto.

In the flow sheet of Figure 1, the dry citrus pulp and the liquid ammonia are shown as supplied to the extractor-reactor, in which the reaction of the liquid ammonia with the pulp takes place and in which the extraction of the glucoside and the limited amount of sugar by the liquid ammonia also takes place. In general, the amount of the volume of liquid ammonia is desirably in excess of the volume of dry citrus pulp so as to insure dissolving of the glucoside. The mixture of liquid ammonia and pulp is desirably agitated to promote reaction and extraction.

This reaction and extraction operation, when carried out at atmospheric pressure, results in boiling off of some of the liquid ammonia due to the sensible heating of the added dry citrus pulp which is higher than the boiling point of liquid ammonia, and due to the heat of reaction between the ammonia and the sugars and other constituents of the pulp. The ammonia vapors thus boiled off from the extractor-reactor are passed to an ammonia recovery system.

The reaction and extraction which takes place in this first step of the process results in the production of two products which are separated from each other—one being the liquid ammonia extract containing the glucoside and a limited amount of sugar which, as shown in the flow sheet, is passed to an ammonia evaporator and residue dissolver, and the other being the reaction product remaining after the liquid ammonia extract has been drawn off which is passed to an evaporator where it is heated to a moderate temperature to remove excess ammonia.

The ammonia vapors given off from this evaporator are also passed to an ammonia recovery system.

The ammoniated residue is desirably agitated to promote the heating and removal of excess ammonia, some of which tends to be held in the porous reaction product until driven off by moderate heating. This heating which drives off the excess ammonia does not free the product from a residual ammonia odor which persists even after prolonged heating, and which is undesirable from a cattle feed point of view. To remove this undesirable ammonia odor from the product, it is passed from the evaporator to a humidifier and deodorizer where an acid or acid material is added to remove the ammonia odor, and where water is added to give a product of proper moisture content suitable for use as a finished cattle feed product, e. g., around 10%, more or less.

Where an aqueous solution of sulfuric or phosphoric acid or of an acid phosphate is added to the product in the humidifier and deodorizer, the product can be directly produced with the ammonia odor removed and of proper moisture content.

In the flow sheet, the liquid ammonia extract containing the glucoside and a limited amount of sugar is heated in the ammonia evaporator to drive off the liquid ammonia more or less completely and the ammonia vapors so driven off are passed to the ammonia recovery system. Some water will ordinarily be contained in the dry citrus pulp treated and will be admixed with the extracted materials after the driving off of most or all of the liquid ammonia. The product thus freed from the liquid ammonia solvent will contain the glucoside in the form of an ammonia compound and will also contain the extracted sugars largely if not entirely in the form of ammonia reaction compounds.

In order to separate the glucoside, water is added to dissolve the extracted products to form a water solution. And this solution is passed to the acidifier where the solution is acidified by adding sufficient acid, e. g., sulfuric acid, to give an acid pH and to set free the glucoside from its combination with ammonia. The freed glucoside is relatively insoluble, even in the presence of the sugar compounds and, by proper acidification and agitation, crystallization of the glucoside will begin and can be continued by passing the acidified product to a holding tank and holding it until the glucoside has been substantially precipitated.

By passing the resulting product through a filter, the glucoside is filtered off and recovered and an aqueous solution of sugar compounds is then passed to an evaporator and evaporated to give a concentrated ammoniated sugar product. The solution after filtering is an acid solution part or all of which can be returned, as shown in the dotted line, to the humidifier and deodorizer for neutralizing the ammonia odor and adding moisture to the extracted reaction product. Similarly the solution after concentration, and which is also acid in character, can be returned in part or in whole as shown in dotted lines to the humidifier and deodorizer for admixture with the extracted ammoniated residue. If the amount of unconcentrated or concentrated solution thus returned gives a wet mixture containing too much water, the mixture can be further dried to remove excess water, to give the finished feed a proper moisture content.

By returning all of the ammoniated sugar solution, or all of the concentrated ammoniated sugar solution, after filtering off the glucoside, and admixing it with the extracted ammoniated residue, a composite ammoniated product is produced which contains all of the ammoniated citrus pulp treated, except the glucosides which are extracted and removed. And since acid is added to acidify the solution before crystallizing the glycoside, and a further amount of acid may be added to neutralize the ammonia odor of the extracted product, the final cattle feed will also contain ammonia compounds of the added acid.

The amount of such ammonia compounds of added acid will vary with the amount of acid required to acidify the extract to set free the glucoside. If all of the liquid ammonia is driven off from the solution before the residue is dissolved in water and acidified, only a small amount of acid is required to give the aqueous solution a desirable pH e. g. of around 4. If some of the liquid ammonia remains in the product, due to incomplete removal, this excess ammonia will also require neutralization by acid and a larger amount of acid will be required in this case, with the corresponding increase in the amount of ammonium compounds formed by neutralization of this acid.

In the flow sheet, the ammonia vapors given off from the extractor-reactor, from the evaporator and from the ammonia evaporator are all shown as going to an ammonia recovery system. Various ammonia absorption systems can be used for condensing or recovering this ammonia. The passage of the ammonia vapors through a condensor maintained at a temperature sufficiently below the boiling point of ammonia will serve to condense and liquefy the ammonia vapors so that they can be returned to the process. Ammonia absorption refrigeration plants are available for recovering the ammonia and converting it to liquid ammonia. Ammonia compression and compression systems combined with refrigeration, can also be used, such systems commonly operating at considerably higher pressures than atmospheric.

Figure 2 shows an arrangement of apparatus for carrying out the process in a continuous manner, with continuous supply of the dry citrus pulp and liquid ammonia to the extractor-reactor, continuous drawing off of the liquid ammonia extract, continuous removal of excess ammonia from the extracted ammoniated pulp and continuous admixture of an acid to remove the ammonia odor from the product so that the ammoniated cattle feed product can be directly produced in a continuous manner.

The apparatus for treating the extract for the separation of the glucoside from the ammoniated sugar solution is shown as carried out batchwise, with alternating receivers for the extract to accumulate batches which are separately and successively treated.

One of the valuable citrus pulps, which contains hesperidin as its principal glucoside, is orange pulp, and in the following detailed description of the apparatus and the carrying out of the process therein, the dried citrus pulp referred to is dried orange pulp so that hesperidin is the glucoside extracted and recovered as a valuable product of the process.

In the apparatus of Figure 2, the extractor-reactor 1 is horizontally arranged with a broken flight screw conveyor 2 therein and an end plate or wier 3 near the discharge end over which the extracted pulp passes to the discharge portion 4. A sight glass 5 is provided to show the liquid level during the extraction and reaction.

The dried orange pulp is contained in the feed hopper 6 and supplied therefrom through the feed conduit 7 by a variable speed screw conveyor 8 for regulating the rate of continuous supply of the dried pulp to the extractor-reactor.

A supply of liquid ammonia is provided in the liquid ammonia tank 10 which has a supply pipe 11 for supplying liquid ammonia thereto. A liquid ammonia pipe 12 leads from the tank 10 through the flow meter 13 to two branch pipes 14 and 15. The main flow of liquid ammonia is through the branch pipe 14 to supply the liquid ammonia for the reaction and extraction. A small amount of liquid ammonia is supplied through the branch pipe 15 to wash the pulp leaving the reaction and extraction treatment.

Ammonia vapors given off in the extractor-reactor are passed through the pipe 16 to an ammonia condensor shown conventionally at 17 for cooling and condensing the ammonia vapors and returning them as liquid ammonia to the tank 10.

The liquid ammonia extract is drawn off from the extractor-reactor through the pipe 19 having valve 18 therein to one or the other of two boilers 20 and 21.

From the extractor-reactor, the extracted reaction product passes over the end plate or wier 3 into the discharge portion 4 and down into the inlet 22 of the evaporator 23, which has a broken flight screw conveyor 24 therein and which is also provided with a heating jacket 25 and an ammonia vapor outlet 26 leading to the condensing system 17.

The evaporator 23 is somewhat inclined toward the inlet end 22 and this inlet portion has a screen 27 at the bottom leading to an outlet 28 for the liquid ammonia which drains from the pulp, including the liquid ammonia used for washing the pulp. This liquid ammonia will also contain extracted material and passes through the pipe 29 to mix with the extract going to the boilers 20 or 21.

The discharge end 30 of the evaporator discharges the product, after the removal of excess ammonia, to the inlet 31 of a conveyor chamber 32 having a broken flight screw conveyor 33 therein and having an acid liquor tank 34 located near the inlet of the chamber and connected to the chamber through the feed pipe 35 having valve 36 therein. The added acid solution or liquid is mixed with the material passing through the conveyor chamber to neutralize the objectionable ammonia odor and to give the product a desirable moisture content.

From the discharge end of this conveyor chamber, the finished product is discharged through the conduit 37 to a station 38 for bagging or packaging the product, or for conveying it to a place of storage.

In the operation of the apparatus thus described, liquid ammonia will be first supplied to the extractor-reactor to form a body of liquid ammonia therein and the dried orange pulp will then be supplied at a regulated rate and subjected to reaction and extraction with the liquid ammonia, which will be continuously supplied in proper proportion to maintain a continuous reaction and extraction.

The mixture of liquid ammonia and pulp will be kept in agitation by the broken flight screw conveyor which will cause the pulp to progress from the feed end to the discharge end of the extractor-reactor, where it will be carried up by the blades of the conveyor and discharged over the end plate 3 into the discharge portion 4. Ammonia vapors boiled off from the liquid ammonia during the extraction and reaction, will be conveyed by the pipe 16 to the condensing system 17. The liquid ammonia extract will be continuously drawn off through the pipe 19 to one or the other of the boilers 20 and 21. The ammoniated extracted product discharged from the extractor-reactor will be washed with a small amount of liquid ammonia supplied through the branch pipe 15 and the resulting solution and any excess liquid ammonia discharged with the product will flow through the screen 27 and be united with the main liquid ammonia extract.

In the evaporator 23 moderate heat will be supplied through the heating jacket 25 and the material will be kept agitated by the broken flight screw conveyor so that the excess ammonia will be driven off to free the extracted product from excess ammonia.

The resulting product discharged into the inlet 31 of the conveyor chamber 32 will have an objectionable ammonia odor which will be neutralized and overcome by the addition of a regulated amount of acid material. And if the proper amount of water is also added with the acid the product which is subjected to repeated agitation in the screw conveyor chamber will leave this chamber not only free from ammonia odor but also of a desirable water content for a cattle feed, e. g., around 10%, more or less.

The process thus far described is a continuous process, with continuous supply of the dry orange pulp, continuous supply of liquid ammonia for the extraction and reaction, continuous evaporation of excess ammonia from the extracted reaction product, continuous drawing off and condensation or recovery of ammonia vapors from the extractor-reactor and evaporator and continuous admixture of aqueous acid to neutralize the ammonia odor and to add a desirable amount of moisture to the product.

The ammonia condensing system shown is a refrigerated condenser, cooled to a temperature below that of the boiling point of liquid ammonia, e. g., around −40° F. or lower, in which the ammonia vapors are cooled and condensed and liquefied with return of the liquid ammonia to the supply tank 10. Added ammonia can be added through the feed pipe 11 to make up for the ammonia used in the process.

A certain amount of air and moisture are introduced into the system during the process, e. g., with the citrus pulp, and some air and moisture will be admixed with the ammonia vapors from the process. These must be purged from the system. The purge arrangement shown is a pipe 41 leading from the top of the tank 10 and having valve 42 therein and leading to a condenser 43 for cooling and condensing ammonia which returns as liquid ammonia to the tank 10 and with the gases then passing through the pipe 44 to a water scrubber tower or pipe 45 supplied with water spray from the pipe 46 and with a discharge outlet for the ammonia waters shown at 47.

The liquid ammonia extract produced in the extractor-reactor is drawn to one or the other of the two boilers 20 and 21, one boiler being filled, while the other is being heated, and these boilers operating alternately rather than continuously. This liquid ammonia extract contains the sugars largely or entirely as ammoniated sugars and contains the hesperidin as a soluble ammonium compound and also contains a small amount of water.

Each of the boilers 20 and 21 is connected with the pipe leading the liquid ammonium extract from the extractor-reactor so that each boiler can be used alternately. Each boiler has a jacket 50 connected to a steam line 51 with valve 52 therein so that each boiler can be heated independently. The condensate from the heating jacket passes off through the drain pipe 54.

Each boiler has an ammonia vapor outlet 55 leading to the ammonia line 56 which in turn leads to the condensing system. Flap valves 57 permit ammonia vapors from either boiler to pass through the line 56, while preventing backflow of vapors to the other boiler.

Each boiler is connected to a water supply line 58 having valves 59 to supply water to either boiler, and each boiler has a draw-off line 60 with valve 61 therein. Each boiler has a sight glass 62 and an agitator driven by the motor 63. The draw-off lines 60 are connected to the pump 64 for pumping the solution through the line 65 to a digestor 66 having a steam jacket with steam inlet line 67 and condensate line 68 and with an agitator driven by the motor 69.

An acid tank 70 is connected through the line 71 with valve 72 therein for introducing an acid in regulated amount to the digestor 66. The outlet line 73 from the digestor with valve 74 therein leads to the pump 75 which discharges the liquid through the line 76 to the large tank 77 where crystallization of the hesperidin takes place.

From the tank 77 the liquid flows through the line 78 to the pump 79 and is pumped through the line 80 having valve 81 therein to a filter 82, such as a normal plate or frame or other type of filter, for filtering off the hesperidin which is recovered at 83, while the filtered liquid passes through the line 84 to an evaporator 85 and is heated to form a concentrated or viscous solution and discharged through the line 86 to storage 87, or may be returned as indicated in the diagrammatic flow sheet, Figure 1, for admixture with the dried extracted ammoniated product.

In the operation of the apparatus for treating the liquid ammonia extract, this extract is run first into one of the boilers where it is heated to boil off the ammonia which passes to the ammonia recovery system, leaving the ammoniated extract with some admixed water in the boiler. Water is then added to the boiler to dissolve the ammoniated product and form an aqueous solution which is promoted by agitation of the material in the boiler.

The resulting aqueous solution then passes to the digestor wherein an acid, e. g. concentrated sulfuric acid, is added to set free the hesperidin, the amount added being such as to give a pH of about 4. This acidified solution is held in the digestor for a period of time to bring about initial crystallization of the heperidin and is then transferred to the crystallizing tank where it is held for a period of several hours and allowed to cool to effect substantially complete crystallization of the hesperidin, which is removed by the filter, leaving an aqueous solution substantially free from hesperidin.

As an illustrative example of the carrying out of the process in the apparatus described there is fed to the extractor-reactor dry orange pulp and liquid ammonia at the rate of, e. g. about 500 pounds of pulp (dry solid base) and 1200 pounds of the liquid ammonia per hour, of which approximately 1080 pounds goes to the extractor-reactor through the line 14 and approximately 120 pounds is used as a final rinse for the extracted product through the line 15.

The extracted and washed ammoniated product is passed through the evaporator 23 to remove excess ammonia and the resulting product is mixed with a limited amount of acid liquor in the conveyor chamber 32 to produce around 480 pounds of finished ammoniated pulp of around 15% crude protein equivalent, calculated on the solids, and around 10% moisture. The amount of dried material going to the conveyor chamber 32 represents around 430 pounds of ammoniated feed solids and, with the addition of about 50 pounds of acid liquor, gives around 480 pounds of the finished product.

Ammonia vapor from the extractor-reactor and also from the evaporator pass to the ammonia recovery system where the ammonia is condensed and returned to the ammonia tank.

The liquid ammonia extract drawn off from the extractor-reactor, when the rate of feed and liquid ammonia supply is as indicated above, is a solution containing around 735 pounds of liquid ammonia, around 76 pounds of solids in the form of ammoniated sugars and hesperidin and around 50 pounds of water. That is, where the hourly rate of feed of orange pulp solids and liquid ammonia is that indicated above per hour, the rate of ammonia extract produced per hour is illustrated by the figures indicated.

This liquid ammonia extract is run into one or the other of the boilers where the ammonia is boiled off and returned to the ammonia recovery system. For the amount of ammonia solution referred to above, containing about 76 pounds of solids and 50 pounds of water, there is added, after the ammonia has been boiled away, around 450 pounds of water to dissolve the solids and the resulting solution is then run into the digestor where it is held for approximately 2 hours at 140 to 160° F. and is, prior to this holding, adjusted to a pH of 4 with sulfuric acid. The amount of 96% sulfuric acid may be as little as 1 pound where the ammonia is substantially completely removed from the boiler, or may be a considerably larger amount where some of the ammonia remains behind and requires neutralization with the acid.

After holding in the digestor for from 1 to 2 hours, the material is transferred to the crystallizing tank where it is held for around 10 to 12 hours, more or less, and allowed to cool to effect substantially complete crystallization of the hesperidin, or until no more crystals appear after filtering a small sample of the solution. After this cooling and crystallization for the proper length of time it is pumped through the filter, giving, for example, about 5 pounds of hesperidin and a solution containing around 70 pounds of ammoniated sugars, which when evaporated will produce a concentrated solution of about 72 brix and containing an amount of nitrogen corresponding to around 55% crude protein equivalent, based on the solids.

The two boilers are so arranged that each boiler holds, for example, the liquid ammonia extract produced in one hour's time, and the boilers are used alternately. These boilers have sufficient heat transfer surface to furnish enough heat to boil the liquid ammonia from the solution in about 1 hour or somewhat less.

After all of the ammonia is removed from the boiler, the water is added to dissolve the solids, or admix solids and water, left in the boiler and the amount of water should be such as to give a workable solution, avoiding an unnecessary excess which would require added evaporation of water after the crystallization of the hesperidin.

With a limited and partial extraction of ammoniated sugars along with the hesperidin, while leaving the major portion of the ammoniated sugars behind in the extracted residue, the amount of ammoniated sugars in the aqueous extract is such that the hesperidin can be crystallized therefrom.

The use of an excessive amount of liquid ammonia is undesirable because it tends to extract a larger proportion of the ammoniated sugars and to leave less of the ammoniated sugar in the extracted residue.

In the operation of the process in a continuous manner the time of holding of the reaction mixture in the extractor-reactor for effecting the reaction of the liquid ammonia with the pulp and for effecting extraction of the hesperidin and of a limited amount of ammoniated sugar can be varied, e. g., between 5 and 20 minutes, more or less. A period of about 20 minutes in the extractor-reactor is a satisfactory period of time. But a shorter period of time is sufficient to effect substantially complete extraction of the hesperidin.

The solubility of hesperidin in liquid ammonia is such that it is readily extracted in a relatively short period of time provided there is sufficient agitation to insure thorough penetration and extraction of the granular pulp of the liquid ammonia.

The press liquid containing the ammoniated sugars, after removal of hesperidin, may either be evaporated to give a thick molasses-like product, or may be used in part to acidify the ammoniated and extracted pulp in the screw conveyor 32. Where the total amount of concentrated solution is added to, and admixed with, the ammoniated extracted pulp and the resulting mixture contains too much water for a satisfactory cattle feed, it can be further dried to remove the excess water. In this case, the cattle feed will contain the ammoniated products of the extracted pulp, and the ammoniated products from the solution, which together constitute substantially the entire pulp treated in an ammoniated condition except for the removal of the hesperidin. In this way, a finished cattle feed can be produced containing a large amount of combined nitrogen approximating 20% of crude protein-equivalent nitrogen.

Another use for the ammoniated product remaining after the removal of hesperidin is for admixture with citrus molasses to increase its protein-equivalent nitrogen content.

While the process has been described more particularly in connection with the treatment of dried orange pulp for the recovery of hesperidin as a valuable product of the process and for the production of a substantially hesperidin-free ammoniated pulp product, the process is also applicable to the treatment of other citrus pulp, e. g., to grapefruit pulp, for the production of naringin, or to other citrus pulps or mixtures of pulps for the production of glusosides therefrom.

The present process has the advantage that it is an anhydrous process or substantially anhydrous for converting dried citrus pulp to valuable glucoside-free dry ammoniated pulp products.

The present process has the further advantage that it is carried out at a low temperature and gives a light-colored product and avoids injury due to overheating or carbonization or darkening of the product at high temperatures. The temperature of the reaction and extraction step of the process is automatically maintained by the boiling of liquid ammonia at its boiling temperature so that overheating by heat of reaction or otherwise is avoided.

The process also has the advantage of producing simultaneously an ammoniated citrus pulp residue from which the glucoside and a limited amount of ammoniated sugar has been extracted but which retains in the extracted ammoniated product the major portion of the ammoniated sugars, as well as other ammoniated constituents.

The process also has the advantage that it not only extracts the glucoside but effects only a partial and limited extraction of sugars, giving an extract which, after removal of the liquid ammonia and digesting in an acidified aqueous solution, permits crystallization of the glucoside in the presence of the ammoniated sugars.

From a product standpoint, the present invention provides not only for the production of hesperidin or other glucoside, as a valuable product of the process, but also for the production of ammoniated cattle feed products substantially free from glucosides.

One of the valuable products is the extracted ammoniated pulp, free from glucosides and from a part only of the ammoniated sugars and being an ammoniated pulp with a high nitrogen and protein-equivalent content.

Another valuable product of the process is the ammoniated sugar extract after the crystallization of the glucoside therefrom, which is a valuable ammoniated sugar product. It is not only free from glucoside but has a very high nitrogen or protein-equivalent content and is valuable for use in admixture with other cattle feed products, including ordinary untreated dried citrus pulp with which it can be admixed and including ordinary citrus molasses with which it can be admixed to increase the protein-equivalent content of such products.

A valuable combined product of the process is the mixture of extracted ammoniated pulp and of the concentrated extracted portion of the pulp, after removal of glucoside. If all of the ammoniated sugar extract is admixed with all of the extracted ammoniated pulp, the product, in effect, contains substantially all of the original pulp constituents in an ammoniated condition, except for the removal of the glucosides, such as hesperidin.

I claim:

1. The method of treating dried citrus pulp to extract glucosides therefrom and to form an ammoniated pulp product which comprises reacting the dried pulp with an excess of liquid ammonia at low temperatures to effect reaction of the liquid ammonia with the pulp and to extract from the pulp glucosides and a limited amount of the sugar of the pulp, separating the liquid ammonia extract containing the glucosides and part of the sugars from the ammoniated pulp, heating the ammoniated pulp to free it from excess ammonia, and treating the resulting ammoniated pulp product with an acid to free it from its ammonia odor.

2. The method of treating dried citrus pulp to remove glucosides therefrom and to form an ammoniated pulp product which comprises admixing and reacting and extracting the pulp with an excess of liquid ammonia at atmospheric pressure and at approximately the boiling point of liquid ammonia, removing the excess ammonia with extracted constituents including glucosides and part of the ammoniated sugar of the pulp, heating the extracted ammoniated pulp to remove excess ammonia therefrom and adding to the resulting ammoniated pulp an aqueous acid solution to remove the ammonia odor from the product.

3. The continuous process of treating dried citrus pulp for the extraction of glucosides and part of the ammonia therefrom and to give an ammoniated pulp product which comprises continuously adding and admixing the dried citrus pulp and an excess of liquid ammonia with agitation of the mixture and maintenance of the mixture at approximately atmospheric pressure and the boiling point of liquid ammonia, to effect reaction of the liquid ammonia with the pulp and a selective extraction of glucosides and part of the sugar therefrom, continuously removing the liquid ammonia extract so produced from the ammoniated pulp, continuously heating the resulting pulp to free it from excess ammonia, and continuously admixing with the resulting pulp an acid to remove the ammonia odor from the pulp.

4. The method of recovering glucosides and a liquid ammoniated sugar product from dried citrus pulp which comprises reacting the pulp with an excess of liquid ammonia at approximately atmospheric pressure at the boiling point of liquid ammonia to effect reaction of the liquid ammonia with the pulp and to effect partial and selective extraction of glucosides and part of the ammonia therefrom, drawing off the resulting liquid ammonia extract, removing liquid ammonia therefrom, dissolving the resulting product in water to form an aqueous solution, acidifying the solution and crystallizing the glucoside therefrom, and reconcentrating the resulting ammoniated sugar solution, substantially free from glucosides, to form a concentrated ammoniated sugar product.

5. The method of treating dried orange pulp for the production of hesperidin and an ammoniated pulp product therefrom which comprises reacting and extracting the pulp with an excess of liquid ammonia at low temperature to effect reaction of the liquid ammonia with the pulp and to extract hesperidin and a limited amount of ammoniated sugar, drawing off the resulting liquid ammonia extract containing the hesperidin, removing liquid ammonia therefrom, forming an acidified aqueous solution from the resulting product and crystallizing hesperidin therefrom.

6. The method of treating dried orange pulp for the production of hesperidin and an ammoniated pulp product therefrom which comprises reacting and extracting the pulp with an excess of liquid ammonia at approximately atmospheric pressure and at approximately the temperature of boiling ammonia to effect extraction of hesperidin and part of the sugars, as an ammoniated sugar product, while leaving the major portion of the sugars unextracted in the ammoniated product, removing the liquid ammonia extract and freeing it from liquid ammonia, forming an acidified aqueous solution from the resulting product and crystallizing hesperidin therefrom, separating the hesperidin from the aqueous ammoniated sugar solution, concentrating the resulting solution, heating the ammoniated residue from which the extract is separated, freeing it from excess ammonia, and admixing the concentrated ammoniated sugar extract with the extracted residue to free it from its ammonia odor and to give a composite product containing both the ammoniated residue and the extracted ammoniated sugars.

References Cited in the file of this patent

UNITED STATES PATENTS

| | | |
|---|---|---|
| 2,215,944 | Vincent | Sept. 24, 1940 |
| 2,421,061 | Higby | May 27, 1942 |
| 2,442,110 | Baier | May 25, 1948 |
| 2,458,679 | Buxton | Jan. 11, 1949 |
| 2,603,567 | Stiles | July 15, 1952 |
| 2,724,648 | Burdick | Nov. 22, 1955 |